United States Patent
Mondello et al.

(10) Patent No.: US 11,012,425 B2
(45) Date of Patent: May 18, 2021

(54) REPLAY PROTECTION NONCE GENERATION

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 286 days.

(21) Appl. No.: 16/235,189

(22) Filed: Dec. 28, 2018

(65) Prior Publication Data

US 2020/0213281 A1 Jul. 2, 2020

(51) Int. Cl.
*H04L 29/06* (2006.01)
*H04L 9/32* (2006.01)
*H04L 9/06* (2006.01)
*G06F 7/58* (2006.01)

(52) U.S. Cl.
CPC .......... *H04L 63/0428* (2013.01); *G06F 7/582* (2013.01); *H04L 9/0643* (2013.01); *H04L 9/3278* (2013.01)

(58) Field of Classification Search
CPC . H04L 63/0428; H04L 9/3278; H04L 9/0643; H04L 63/126; H04L 63/08; H04L 63/1466; H04L 9/3242; H04L 9/0866; H04L 9/0841; H04L 9/002; H04L 9/3252; G06F 7/582
See application file for complete search history.

(56) References Cited

U.S. PATENT DOCUMENTS

| | | | | |
|---|---|---|---|---|
| 6,430,170 | B1 * | 8/2002 | Saints | G06F 7/588 370/206 |
| 9,311,403 | B1 * | 4/2016 | Ioffe | G06F 16/5838 |
| 10,205,595 | B2 * | 2/2019 | Frascadore | H04L 9/0662 |
| 2002/0154769 | A1 | 10/2002 | Petersen et al. | |
| 2009/0199002 | A1 * | 8/2009 | Erickson | H04L 9/3271 713/171 |
| 2010/0306294 | A1 * | 12/2010 | Schneider | G06F 7/58 708/250 |
| 2011/0055580 | A1 | 3/2011 | Narasimhan | |

(Continued)

FOREIGN PATENT DOCUMENTS

| | | |
|---|---|---|
| KR | 20130122664 | 11/2013 |
| TW | 200929219 | 7/2009 |

(Continued)

OTHER PUBLICATIONS

"International Application Serial No. PCT US2019 066004, International Search Report dated Apr. 6, 2020", 3 pgs.

(Continued)

*Primary Examiner* — Michael R Vaughan
(74) *Attorney, Agent, or Firm* — Schwegman Lundberg & Woessner, P.A.

(57) ABSTRACT

Devices and techniques for replay protection nonce generation are described herein. A hash, of a first length, can be produced from a first input. A first subset of the hash can be extracted as a selector. A second subset of the hash can be selected using the selector. Here, the second subset has a second length that is less than the first length. The second subset can be transmitted as a nonce for a freshness value in a replay protected communication.

24 Claims, 7 Drawing Sheets

(56) References Cited

U.S. PATENT DOCUMENTS

| | | | |
|---|---|---|---|
| 2011/0158410 A1 | 6/2011 | Falk et al. | |
| 2012/0057702 A1* | 3/2012 | Minematsu | H04L 9/0643 380/255 |
| 2012/0265979 A1* | 10/2012 | Yegin | H04W 12/0609 713/100 |
| 2014/0270162 A1* | 9/2014 | Greiner | G06F 7/582 380/46 |
| 2016/0140357 A1 | 5/2016 | Newell | |
| 2017/0149562 A1* | 5/2017 | Takada | B60R 16/023 |
| 2019/0103973 A1* | 4/2019 | Chalkias | H04L 9/0618 |
| 2020/0213106 A1* | 7/2020 | Kang | H04L 9/0643 |

FOREIGN PATENT DOCUMENTS

| | | |
|---|---|---|
| TW | 201419284 | 5/2014 |
| TW | 201606509 | 2/2016 |
| TW | 201701186 | 1/2017 |
| TW | 201822210 | 6/2018 |
| TW | 202032360 | 9/2020 |
| WO | 2020139573 | 7/2020 |

OTHER PUBLICATIONS

"International Application Serial No. PCT US2019 066004, Written Opinion dated Apr. 6, 2020", 4 pgs.
"Taiwanese Application Serial No. 108146581, Office Action dated Sep. 18, 2020", w English translation, 8 pgs.

* cited by examiner

505

| OPCODE | PARAMETERS (E.G., MODE AND RELATED OPTIONS) | TYPE OF SIGNATURE OF THE RESPONSE |
|---|---|---|

510

| ZERO NONCE | SIGNATURE (IF REQUESTED) |
|---|---|

515

| OPCODE | ZERO NONCE | PARAMETERS | TYPE OF SIGNATURE | SIGNATURE |
|---|---|---|---|---|

| MODE | PROPOSED SEED | DIFFIE HELLMAN PARAMETERS |
|---|---|---|
| 0 | N/A | N/A |
| 1 | SEED | N/A |
| 2 | SEED | N/A |
| 3 | N/A | PARAMETERS FOR PROTOCOL |

FIG. 5

REPLAY PROTECTION NONCE GENERATION

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), or magnetoresistive random-access memory (MRAM), among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data.

However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) can extend adjacent a string of storage cells to form a channel for the storages cells of the string. In the example of a vertical string, the polysilicon structure can be in the form of a vertically extending pillar. In some examples the string can be "folded," and thus arranged relative to a U-shaped pillar. In other examples, multiple vertical structures can be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs can include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 5 illustrates several examples of message formats used during initialization of nonce generation.

DETAILED DESCRIPTION

Figure 1:
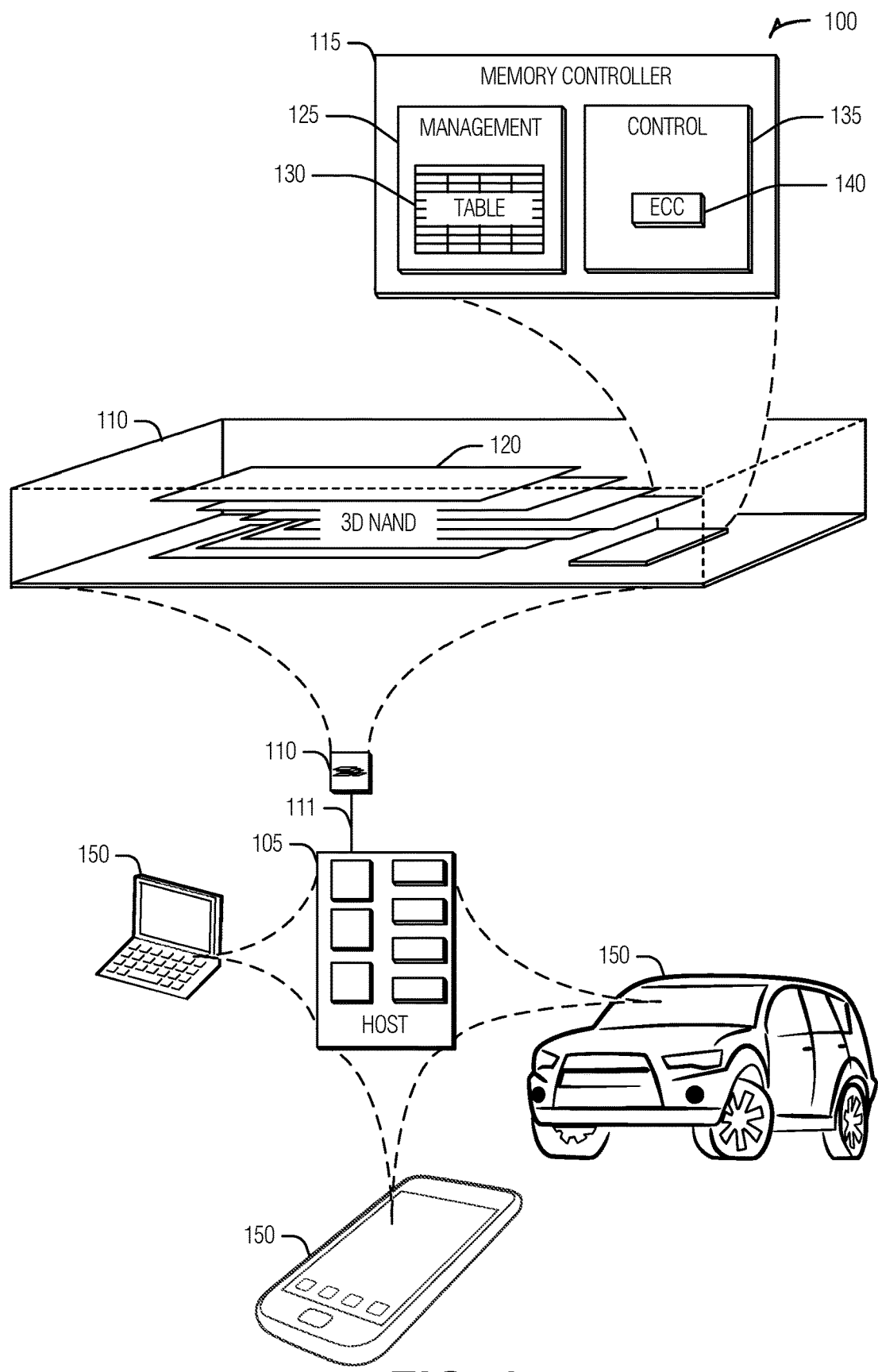
FIG. 1 illustrates an example of an environment including a memory device.

Communication security has taken an ever more important role. To understands different aspects of secure communications, several different areas are considered: identity; authentication; message integrity; data protection (e.g., encryption); data attestation; and anti-replay. Various technologies are used to implement these different facets of secure communications. The systems and techniques described herein, however, focus on anti-replay.

A replay attack, referred to herein as replay, is a technique whereby an attacker copies some or all of an otherwise secure communication between two parties and uses it at a later time to achieve an unauthorized response from one of those two parties. For example, a garage door remote control transmits a radio signal to the garage door control to open the garage door. Even if the remote control needs to authenticate and encrypt the communication, simply recorded the wireless symbols and replaying them at a later date can produce the garage opening effect desired by an attacker. Such a replay attack can be used in other communications, such as between components on a vehicle (e.g., via the controller area network (CAN) bus), between industrial controllers and actuators, or between memory devices and other components that use those memory devices.

Different techniques have been designed to thwart replay. Generally, these techniques involve the inclusion of an everchanging element that valid parties to the communication can predict with each communication. For example, considered a monotonic (e.g., ever increasing) counter. With each message in the communication, both parties increase their respective counters (e.g., by one) and include that value in the reply message. When verifying the reply message, the recipient uses the predicted value of the monotonic counter as part of the verification. If an attacker records and attempts to replay the message, the counter verification will fail along with the replay attack. The everchanging element can be called a freshness value. Using the freshness value can include appending it to the message and securing the message using encryption, a message authentication code (MAC)—such as HMAC-SHA256, or other cryptographic technique (e.g., elliptic curve digital signature algorithm (ECDSA)). A common feature of freshness values, however, is the ability for each party to a communication to predict the next valid freshness value in order to check whether it is correct in any future exchange.

Monotonic counters and timestamps are two techniques used to create freshness values. However, in the context of memory devices that operate as NAND flash memory devices do, these techniques suffer from a few problems. First, monotonic counters involve the storage of a current count value that can change rapidly. Due to the character of NAND flash, individual counter updates generally include a constant write and garbage collection of the counter, involving undue wear on the underlying storage devices and inefficient maintenance operations. Timestamps have the advantage that various pieces of hardware often already have a clock. However, for the freshness value to succeed, the clocks need to be synchronized to a great degree. For add-on memory devices deployed in a variety of hardware configurations, such synchronization is impractical.

To solves these issues of freshness value generation, nonce (e.g., number once) generation can be used. Here, nonce refers to some value that does not have meaning on its own. Rather, the value in the nonce is the ability for the two parties to ascertain what the next nonce should be in a nonce sequence. Thus, the nonce generation can be accomplished via a pseudo-random number generation based on a known seed between the parties. With a functioning pseudo-random number generator, an observer without access to the seed should not be able to tell (e.g., via statistical analysis) what a next value in the sequence will be, but the two parties will be able to generate this value independently.

In an example, after an initial seed is agreed upon by the two parties, the memory device can use that seed to create a hash. A part of this hash can be used as the freshness value. For example, consider a hash of 256 bits and a desired freshness value of 32 bits. The 256 bits of the hash can be divided into eight 32-bit segments. The first three bits—or any defined technique of three bits, such as the last three bits, the first bit, the middle bit, and the last bit, the first three of every fourth bit, etc.—are used as an identification of the group. Thus, the bits of whatever group of bits in the eight groups that are identified by those three bits are used as the freshness value. The hash can then be used as the seed in a new iteration of this process to determine the next freshness value.

Nonce generation works better than other freshness value techniques for NAND flash type devices because the seed can be stored and reused during a session (e.g., no non-volatile memory is needed) and there is no need to precisely control clock synchronization as is the case with timestamps. In addition, many current memory devices include several hardware or software components to enable other aspects of secure communication, such as physically unclonable function (PUF) blocks, HASH blocks, MAC blocks, encryption and key management blocks, among others. As such, nonce generation can be added to existing device designs with minimal impact. Additionally, a memory device configured to produce a nonce value as described herein can also be a HASH-Deterministic Random bit generator (HASH-DRBG) for other components to which it communicates, such as a processor.

Figure 2:
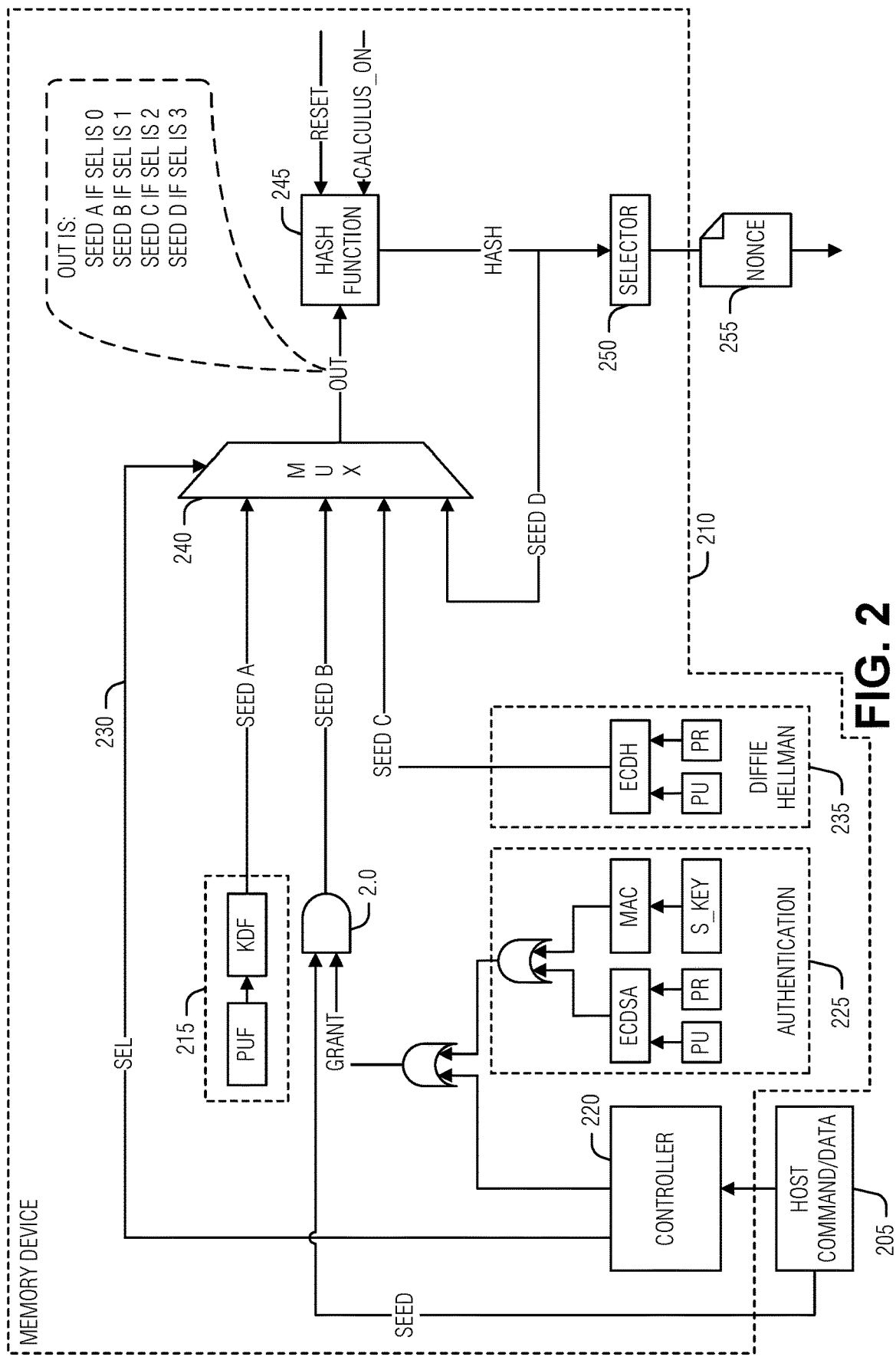
FIG. 2 illustrates an example of a system that generates a nonce for replay protection.
Figure 6:
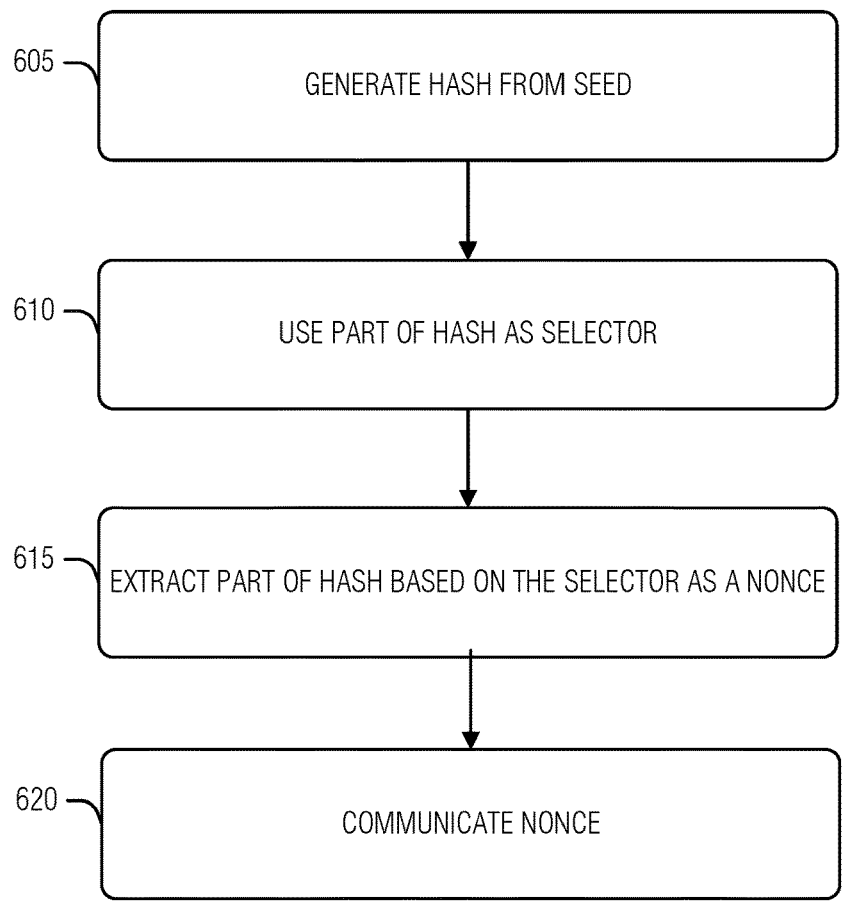
FIG. 6 illustrates a flowchart of an example of a method for replay protection nonce generation.

Additional details and examples are described below. FIG. 1 includes several details about a managed memory device (e.g., a memory controller is included in the memory device), and FIG. 2 illustrates architectural features more specific to replay protection nonce generation, and FIG. 6 illustrates several variations to the operations of this architecture.

FIG. 1 illustrates an example of an environment 100 including a host device 105 and a memory device 110 configured to communicate over a communication interface. The host device 105 or the memory device 110 can be included in a variety of products 150, such as Internet of Things (IoT) devices (e.g., a refrigerator or other appliance, sensor, motor or actuator, mobile communication device, automobile, drone, etc.) to support processing, communications, or control of the product 150. FIG. 2 provides details more specific to the adjustable NAND write performance using pSLC encoding.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105. In these examples, the memory device 110 communicates with host device 105 components via an interlink 111, such as a bus. Thus, as described herein, a host, or host device 105 operation is distinct from those of the memory device 110, even when the memory device 110 is integrated into the host device 105.

One or more communication interfaces (e.g., the interlink 111) can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 can be a machine having some portion, or all, of the components discussed in reference to the machine 700 of FIG. 7.

The memory controller 115 can receive instructions from the host 105, and can communicate with the memory array 120, such as to transfer data to (e.g., write or erase) or from (e.g., read) one or more of the memory cells, planes, sub-blocks, blocks, or pages of the memory array 120. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110. Although the memory controller 115 is here illustrated as part of the memory device 110 package, other configurations can be employed, such as the memory controller 115 being a component of the host 105 (e.g., as a discrete package on a system-on-a-chip of the host 105 that is separate from the memory service 110), or even implemented via a central processing unit (CPU) of the host 105.

The memory manager 125 can include, among other things, circuitry or firmware, such as several components or integrated circuits associated with various memory management functions. For purposes of the present description example memory operation and management functions will be described in the context of NAND memory. Persons skilled in the art will recognize that other forms of non-volatile memory can have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things. In an example, the management tables 103 can include translation tables or a logical-to-physical (L2P) mapping.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data based on the ECC data maintained by the array controller 135. This enables the memory controller 115 to maintain integrity of the data transferred between the host 105 and the memory device 110 or maintain integrity of stored data. Part of this integrity maintenance can include removing (e.g., retiring) failing memory resources (e.g., memory cells, memory arrays, pages, blocks, etc.) to prevent future errors. RAIN is another technique that can be employed by the memory device 110 to maintain data integrity. The array controller 135 can be arranged to implement RAIN parity data generation and storage in the array 120. The memory controller 115 can be involved in using the parity data to reconstruct damaged data.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, can be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB can include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or can require different amounts of metadata associated therewith. For example, different memory device types can have different bit error rates, which can lead to different amounts of metadata necessary to ensure integrity of the page of data (e.g., a memory device with a higher bit error rate can require more bytes of error correction code data than a memory device with a lower bit error rate). As an example, a multi-level cell (MLC) NAND flash device can have a higher bit error rate than a corresponding single-level cell (SLC) NAND flash device. As such, the MLC device can require more metadata bytes for error data than the corresponding SLC device.

FIG. 2 illustrates an example of a system that generates a nonce for replay protection. The system includes a host 205 and a memory device 210 that can operate in a manner as that described above with respect to FIG. 1. In the examples that follow, the host 205 is a partner in a secure communication with the memory device 210. As illustrated, the memory device 210 includes a controller 220, an authentication block 225—which includes an ECDSA element with public and private key (PU/PR) storage and a MAC element with a secret (e.g., symmetric) key storage), a Diffie Hellman block 235—which includes PU/PR storage to an elliptic curve Diffie Hellman (ECDH) element, a key generator 215—which includes a PUF and a key derivative function (KDF) element, a multiplexor 240, a hash engine 245, and a selector block 250.

During an authenticated and replay protected communication, a nonce sequence is initialized. This begins with seed initialization. In an example, the host 205 issues a nonce-request command to the memory device 210 to initialize the freshness (or DRBG generator). In an example, the request passes no substantive data to the memory device 210. In an example, the request includes a signature for the host 205.

In response to the nonce-request command, the memory device 210 is configured to send a zero nonce (e.g., nonce_0) value to the host 205, which will be used for the remaining nonce sequence initialization. After receiving the zero nonce, the host 205 provides a system-setup command to select one of several usage modes support by the memory device 210. In an example, this command is authenticated and uses the zero nonce as an anti-replay measure.

Upon receipt, the controller 220 uses the usage mode to configure the multiplexor 240 via the selector 230. As illustrated, three usage modes are selectable by the host 205; these modes correspond to seed A (mode 0), seed B (mode 1), and seed C (mode 2). As illustrated, in mode 0 the memory device 210 generates a secret seed by using the PUF value processed by the KDF (e.g., seed=KDF(PUF)). In mode 1, the host 205 and the memory device 210 share a public seed. In an example, the seed is not signed, for example, passing directly from the host 205 to the controller 220. In an example, the seed is signed (e.g., by ECDSA or MAC) and is verified by the authentication block 225. In mode 2, the host 205 and the memory device 210 share a secret SEED by using ECDH, or other such technique whereby the secret is part of the protocol setup.

Figure 3:
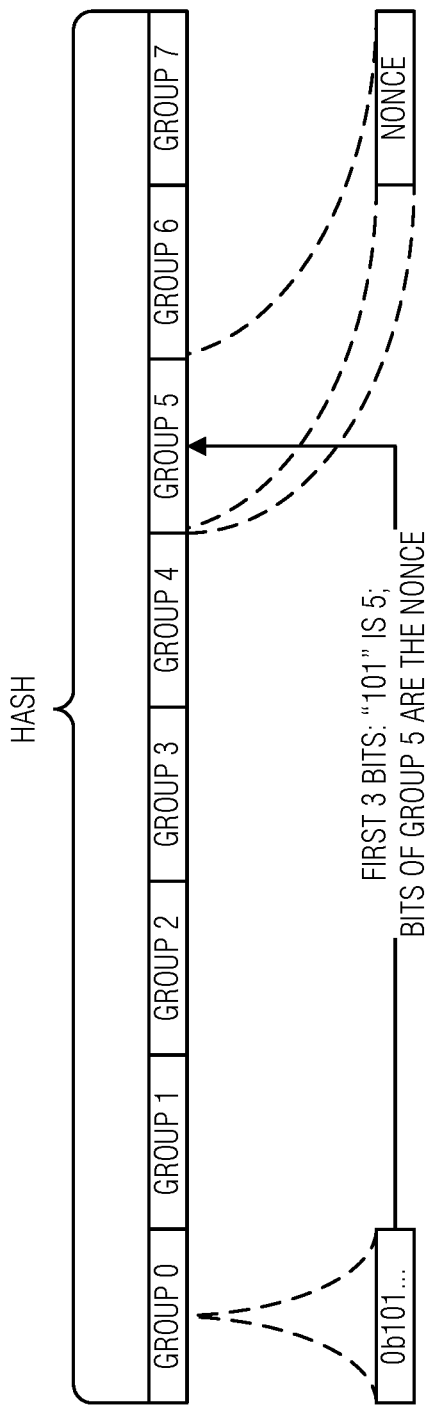
FIG. 3 illustrates an example of self-contained nonce creation from a hash.

Once a mode is selected by the host 205, the controller 220 is arranged to pulse the calculus_on signal to the hash engine 240 to produce a hash from the selected seed source. The hash is sent to the selector block 250. The selector block is configured to select the nonce 255, or the basis for the nonce 255, directly from the hash. For example, if the hash is N bits long, then the selector 250 chooses m bits from the hash to produce the nonce 255 of m bits. FIG. 3 illustrates an example technique that the selector block 250 is configured to use to produce the nonce 255 from the hash.

Figure 4:
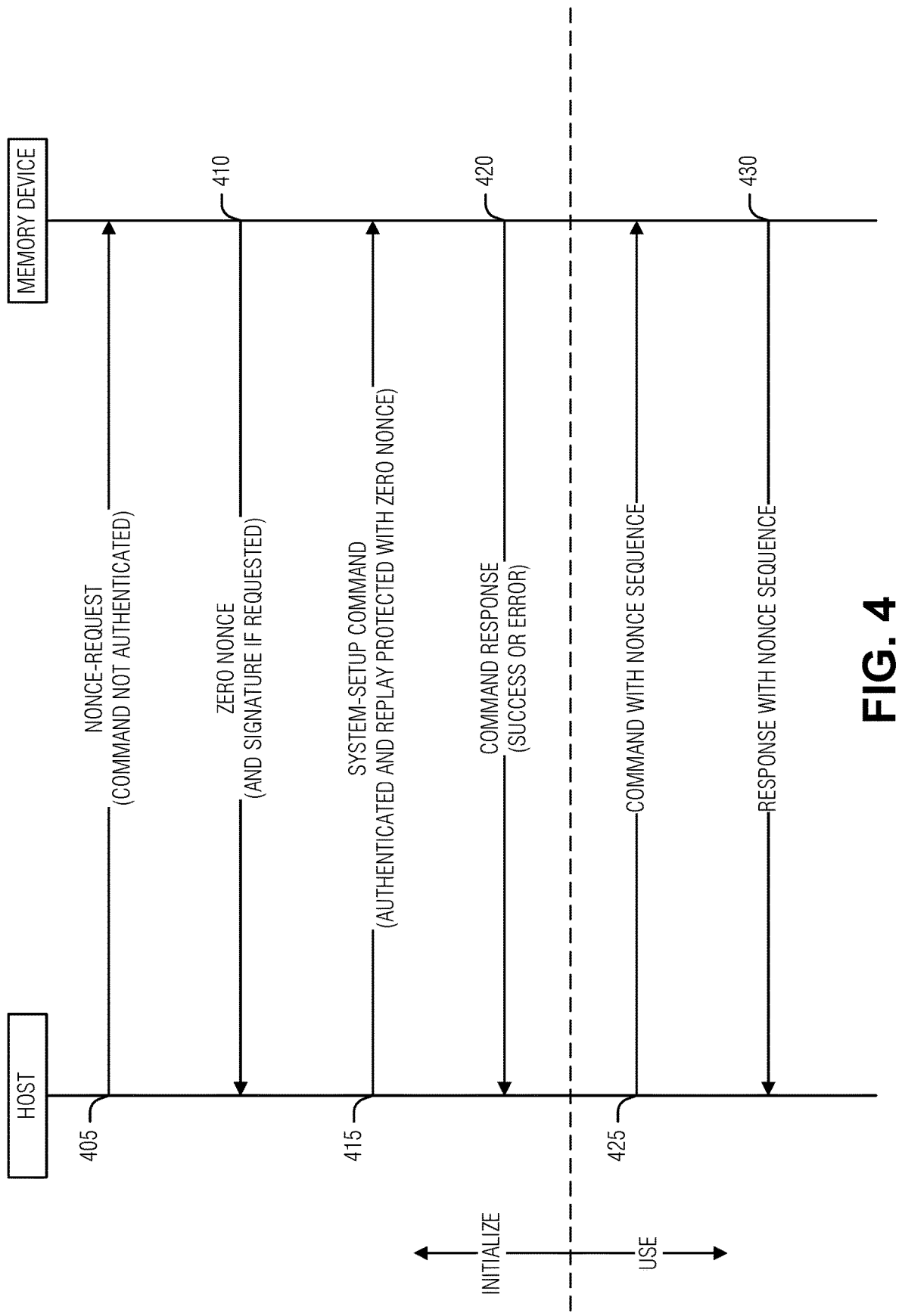
FIG. 4 illustrates an example of a control flow between a host and a memory device performing nonce generation.

After the first hash is created following initialization, the controller 220 selects mode 3 on the multiplexor and the hash is fed back into the multiplexor 240 by the hash engine 245. In this manner the hash is used as the seed in the next nonce-generation in the nonce sequence—e.g., hash$_n$,=SELECTOR(HASH(hash$_{n-1}$)), where SELECTOR is the selector block 250 and HASH is the hash engine 245. The hash engine 245 includes some memory (e.g., a register) to store the hash until it receives the next calculus_on signal from the controller 220 (at which point the hash is delivered to the multiplexor 240) or the reset signal from the controller 220. FIG. 4 illustrates an example of the messages between the host 205 and the memory device 210 (e.g., the controller 220) for both the initialization and then subsequent communications in a nonce sequence.

The illustrated architecture enables a variety of seeds to be used to begin a nonce sequence. Moreover, because many of the elements are already included in modern memory devices, only small additions, such as the multiplexor 240 and the selector block 250, are needed to implement the anti-replay nonce techniques described herein.

FIG. 3 illustrates an example of self-contained nonce creation from a hash. Here, the hash is 256 bits and is divided into eight 32-bit groups that do not overlap. Thus, group 0 includes bits 0-31 of the hash, group 1 includes bits 32-63 of the hash, and so on. To determine which of the eight groups is the nonce, a set of selector bits—sufficient to unambiguously select one of the groups—are extracted from the hash. Thus, for eight groups, three selector bits are extracted. The extraction can be positional, such as the first bits, the last bits, every other bit, etc. The value of the extracted bits determines the group that is selected. Thus, for eight groups, three selector bits are used to unambiguously select one of the eight groups. If the first three bits are extracted, and those bits have a value of 110, then group 6 is chosen and the bits of the hash belonging to group 6 are the nonce.

FIG. 4 illustrates an example of a control flow between a host and a memory device performing nonce generation. The host initializes the memory device for a nonce sequence via a nonce request (message 405). Although this request is unprotected—e.g., enabling any entity to make the request—authentication in later messages can be used to limit which entities can engage in a nonce sequence protected communications session.

In response to the nonce-request, the memory device responds (message 410) with a zero nonce value. In an example, the zero nonce is calculated as the m least significant bits of the output of a KDF that uses a PUF as input, or $nonce_0 = LSB(KDF(PUF), m)$. Using the architecture illustrated in FIG. 2, the controller 220 can select mode 0 via the selector 230 to feed the key block 215 output to the multiplexor 240. The controller 220 can then pulse the calculus_on signal to the hash engine 245 to produce the zero nonce. In an example, after getting the zero nonce, the controller 220 uses the reset signal to the hash engine 245 to clear the zero nonce.

The host next issues a system-setup command (message 415), which is replay protected with the zero nonce, to setup the system. In an example, the system-setup command is authenticated. This example helps to prevent unwanted entities from enabling or resetting a nonce-generation sequence at the memory device. In an example, the system-setup command is authenticated by using an ECDSA or alternatively a MAC as indicated in the command data structure (e.g., as illustrated in FIG. 5).

The memory device uses the data in the system-setup command to configure the nonce sequence generation (e.g., as described above in FIG. 2 or below in FIG. 6) and responds (message 420) with success or failure depending on its ability to carryout the task. Assuming success, following message 420, the host and the memory device can engage in a communication session using the nonce sequence (e.g., messages 425 and 430). If the host would like to restart the nonce sequence for some reason, the host can issue the nonce-request command (message 405) again and renew the process.

FIG. 5 illustrates several examples of message formats used during initialization of nonce generation. As illustrated each of these message data structures include several fields, which are labeled in the figure.

The nonce-request message 505 includes an operation code (opcode), optional parameters (e.g., to select a mode), and a type of signature requested in the response (e.g., 0=MAC, 1=ECDSA, and 2=no signature).

The response message 510 to the nonce request message 505 includes a nonce (e.g., the zero nonce) and a signature if it was requested in message 505.

The system-setup message 515 includes the opcode, the zero nonce for replay protection, setup parameters, a signature type identifier, and the signature itself. As illustrated, the parameters can be structured to include a mode identification and provide the corresponding data expected by the memory device. For example, here, for modes 1 and 2, a seed is expected, whereas mode 3 doesn't involve the sharing of a seed, but rather reliance on an external protocol (e.g., Diffie Hellman). In this case, the parameters include data used to setup the protocol.

FIG. 6 illustrates a flowchart of an example of a method 600 for replay protection nonce generation. The operations of the method 600 are implemented in computer hardware such as that described above (e.g., a memory device) or below (e.g., processing circuitry).

At operation 605, a hash is produced from a first input. The hash has a value of a length as determined by the hashing algorithm used. In an example, the has is a cryptographic hash. In an example, the cryptographic hash is one of an MD5 hash, a secure hash (SHA) (e.g., SGA-0, SHA-1, SHA-2, SHA-3, etc.), RIPEMD-160 hash, Whirlpool hash, or BLAKE2 hash.

At operation 610, a first subset of the hash is extracted as a selector.

At operation 615, a second subset of the hash is selected using the selector. In an example, the second subset is shorter (e.g., has a second length that is less) than the length of the hash, the first length. Thus, the selector is taken from the hash and used to choose a portion of the hash. To this end, the selector characteristics are chosen based on the desired characteristics of the second subset, which will be the basis for the replay protection nonce.

For example, the hash can be divided into several groups, each with a number of bits equal to the desired second subset size. The groups can be non-overlapping or overlapping or the groups can be contiguous or not—for example, if there are five groups, then the groups comprise every fifth bit differentiate by an offset to the beginning of the hash (e.g., group 0 has 0 offset, group 1 has a 1-bit offset, etc.). In this case, the first subset is sized to represent the number of groups (e.g., if there are two groups, the first subset is 1-bit; if there are eight groups, the second subset is 3-bits, etc.). The value of the selector is then used to determine which of the groups is the second subset. For example, if the selector is 0010, then the second subset is group two (with a lowest group index of zero), out of sixteen groups.

Further, the selection of the first subset can be accomplished in any repeatable way until that matches the size of the first subset. Thus, the selector can be the first bits of the specified length, the last bits of the length, every seventh bit of the length, etc. However, due to the approaching-statistically-random nature of the hash, it is often most efficient to pick the first three bits.

The following examples illustrate a non-overlapping group selection. Specifically, the first subset (e.g., selector) has a third length that is based on the first length and the second length. In an example, the third length is equal to a number of bits to represent the first length divided by the second length. In an example, the hash is divided into non-overlapping groups that have a length equal to the second length. In an example, selecting the second subset of the hash using the selector includes evaluating a numerical value of bits in the selector and using a group in the non-overlapping groups that corresponds to the numerical value as the second subset.

At operation 620, the second subset is transmitted as a nonce for a freshness value in a replay protected communication. The transmission can include passing the nonce to a cryptographic component of the same device, or provided to an external entity. In an example, the nonce can function as a HASH-DRBG.

The operations described above relate to a single iteration of freshness generation in a communication session. In an example, the method 600 is extended to include initializing a nonce sequence. Here, the nonce is the first nonce of the nonce sequence and a seed is the first input. In an example, the seed is a type that is one of self-generated (e.g., by a PUF or other random number generator), an unsigned shared public value, a signed shared public value, or a secret value generated from a Diffie Hellman protocol (or any other key or secret exchange used as part of secure communication setup). The last option is akin to the signed shared public value but doesn't require setting more than what the protocol uses to setup the secure channel, which can be more efficient.

When implemented in hardware, to maintain the variety of seed choices given operational parameters, the device can include hardware to accept any of the different types of seeds and a selection mechanism to choose which seed will be used for any given nonce sequence. Thus, in an example, selecting the seed includes receiving—e.g., from a partner in the replay protected communication—a command that specifies a mode. The mode can then be used to update a multiplexer. Here, the multiplexer has an input for each type of seed that is supported. The device can then produce the seed via the multiplexer. Thus, the mode selection defines which of the several inputs the multiplexer will output as the seed.

In an example, the available modes include several input modes and then an ongoing sequence mode. The ongoing sequence mode is used after the nonce is created to create additional nonce values within the nonce sequence. Accordingly, in an example, the method 600 is extended to include creating a second nonce, following the first nonce, in the nonce sequence. The second nonce is created by using the hash of the first nonce as the first input to the second nonce. Here, the ongoing sequence mode is used to replace the seed with the last hash created for each new hash.

The initialization sequence can include additional elements to help ensure a secure exchange to setup the nonce sequence. In an example the command received to agree on the seed is a last communication in the initialization. Here, the includes a first request from the partner to begin the initializing and a response to the first request that is replay protected with a zero-nonce. The zero nonce (e.g., nonce_0) is not part of the nonce sequence, but is rather a one-off value that the device will expect its partner to send back. Thus, the command uses the zero nonce to prevent a replay attack during the initialization. In an example, the command is a data structure with an operation code field, a zero nonce field, a parameter field, a type of signature field, and a signature field. In an example, the parameter field includes a mode identification and a payload. Here, the mode identification is used to set the mode selector on the multiplexor. The payload can be a seed, or other parameter used to derive the seed.

Figure 7:
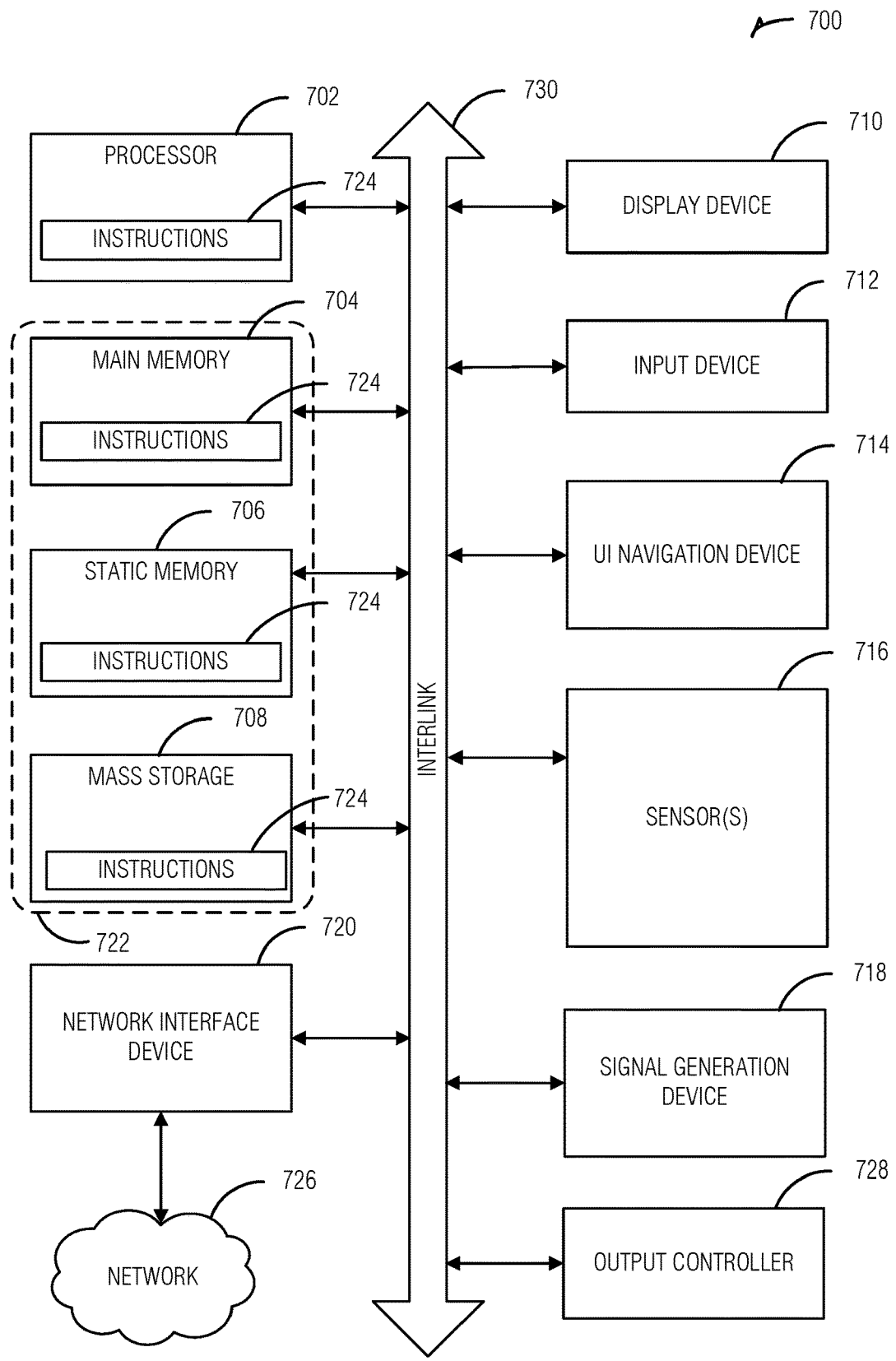
FIG. 7 is a block diagram illustrating an example of a machine upon which one or more embodiments can be implemented.

FIG. 7 illustrates a block diagram of an example machine 700 upon which any one or more of the techniques (e.g., methodologies) discussed herein can perform. In alternative embodiments, the machine 700 can operate as a standalone device or can be connected (e.g., networked) to other machines. In a networked deployment, the machine 700 can operate in the capacity of a server machine, a client machine, or both in server-client network environments. In an example, the machine 700 can act as a peer machine in peer-to-peer (P2P) (or other distributed) network environment. The machine 700 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 700 (e.g., the host device 105, the memory device 110, etc.) can include a hardware processor 702 (e.g., a central processing unit (CPU), a graphics processing unit (GPU), a hardware processor core, or any combination thereof, such as the memory controller 115, etc.), a main memory 704 and a static memory 706, some or all of which can communicate with each other via an interlink (e.g., bus) 708. The machine 700 can further include a display unit 710, an alphanumeric input device 712 (e.g., a keyboard), and a user interface (UI) navigation device 714 (e.g., a mouse). In an example, the display unit 710, input device 712 and UI navigation device 714 can be a touch screen display. The machine 700 can additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 708 can include a machine readable medium 722 on which is stored one or more sets of data structures or instructions 724 (e.g., software) embodying or utilized by any one or more of the techniques or functions described herein. The instructions 724 can also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 708 can constitute the machine readable medium 722.

While the machine readable medium 722 is illustrated as a single medium, the term "machine readable medium" can include a single medium or multiple media (e.g., a centralized or distributed database, or associated caches and servers) configured to store the one or more instructions 724.

The term "machine readable medium" can include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 (e.g., software, programs, an operating system (OS), etc.) or other data are stored on the storage device 721, can be accessed by the memory 704 for use by the processor 702. The memory 704 (e.g., DRAM) is typically fast, but volatile, and thus a different type of storage than the storage device 721 (e.g., an SSD), which is suitable for long-term storage, including while in an "off" condition. The instructions 724 or data in use by a user or the machine 700 are typically loaded in the memory 704 for use by the processor 702. When the memory 704 is full, virtual space from the storage device 721 can be allocated to supplement the memory 704; however, because the storage 721 device is typically slower than the memory 704, and write speeds are typically at least twice as slow as read speeds, use of virtual memory can greatly reduce user experience due to storage device latency (in contrast to the memory 704, e.g., DRAM). Further, use of the storage device 721 for virtual memory can greatly reduce the usable lifespan of the storage device 721.

In contrast to virtual memory, virtual memory compression (e.g., the Linux® kernel feature "ZRAM") uses part of the memory as compressed block storage to avoid paging to the storage device 721. Paging takes place in the compressed block until it is necessary to write such data to the storage device 721. Virtual memory compression increases the usable size of memory 704, while reducing wear on the storage device 721.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 724 can further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks) such as those defined by the Third Generation Partnership Project (3GPP) families of standards (e.g., 3G, 4G, 5G, Long Term Evolution (LTE), etc.), Plain Old Telephone (POTS) networks, and wireless data networks (e.g., Institute of Electrical and Electronics Engineers (IEEE) 802.11 family of standards known as Wi-Fi®)), IEEE 802.15.4 family of standards, peer-to-peer (P2P) networks, among others. In an example, the network interface device 720 can include one or more physical jacks (e.g., Ethernet, coaxial, or phone jacks) or one or more antennas to connect to the communications network 726. In an example, the network interface device 720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that can store, encoding or carrying instructions for execution by the machine 700, and includes digital or analog communications signals or other intangible medium to facilitate communication of such software.

Additional Examples

Example 1 is a memory device for replay protection nonce generation, the memory device comprising: a hash engine to produce a hash from a first input, the hash having a first length; and processing circuitry to: extract a first subset of the hash as a selector; select a second subset of the hash using the selector, the second subset having a second length less than the first length; and transmit the second subset as a nonce for a freshness value in a replay protected communication.

In Example 2, the subject matter of Example 1, wherein the first subset has a third length that is based on the first length and the second length.

In Example 3, the subject matter of Example 2, wherein the third length is equal to a number of bits to represent the first length divided by the second length.

In Example 4, the subject matter of Example 3, wherein the hash is divided into non-overlapping groups that have a length equal to the second length.

In Example 5, the subject matter of Example 4, wherein, to select the second subset of the hash using the selector, the processing circuitry is configured to: evaluate a numerical value of bits in the selector; and use a group in the non-overlapping groups that corresponds to the numerical value as the second subset.

In Example 6, the subject matter of any of Examples 1-5, wherein the processing circuitry is configured to initialize a nonce sequence, wherein the nonce is used as the first nonce, and wherein a seed is selected as the first input.

In Example 7, the subject matter of Example 6, wherein the seed is a type that is one of self-generated, an unsigned shared public value, a signed shared public value, or a secret value generated from a Diffie Hellman protocol.

In Example 8, the subject matter of any of Examples 6-7, wherein, to select the seed, the processing circuitry is configured to: receive, from a partner in the replay protected communication, a command that specifies a mode; use the mode to update a multiplexer, the multiplexer having an input for each type of seed that is supported; and produce the seed via the multiplexer.

In Example 9, the subject matter of Example 8, wherein the command is a last communication in the initializing, the initializing including: a first request from the partner to begin the initializing; and a response to the first request that is replay protected with a zero-nonce, the zero-nonce not being a part of the nonce sequence, wherein the command uses the zero nonce to prevent a replay attack during the initializing.

In Example 10, the subject matter of Example 9, wherein the command is a data structure with an operation code field, a zero nonce field, a parameter field, a type of signature field, and a signature field.

In Example 11, the subject matter of Example 10, wherein the parameter field includes a mode identification and a payload.

In Example 12, the subject matter of any of Examples 6-11, wherein the processing circuitry is configured to create a second nonce, following the first nonce, in the nonce sequence, wherein the hash of the first nonce is used as the first input to the second nonce.

Example 13 is a method for replay protection nonce generation, the method comprising: producing a hash from a first input, the hash having a first length; extracting a first subset of the hash as a selector; selecting a second subset of the hash using the selector, the second subset having a second length less than the first length; and transmitting the second subset as a nonce for a freshness value in a replay protected communication.

In Example 14, the subject matter of Example 13, wherein the first subset has a third length that is based on the first length and the second length.

In Example 15, the subject matter of Example 14, wherein the third length is equal to a number of bits to represent the first length divided by the second length.

In Example 16, the subject matter of Example 15, wherein the hash is divided into non-overlapping groups that have a length equal to the second length.

In Example 17, the subject matter of Example 16, wherein selecting the second subset of the hash using the selector includes: evaluating a numerical value of bits in the selector; and using a group in the non-overlapping groups that corresponds to the numerical value as the second subset.

In Example 18, the subject matter of any of Examples 13-17, comprising initializing a nonce sequence, including the nonce as the first nonce, by selecting a seed as the first input.

In Example 19, the subject matter of Example 18, wherein the seed is a type that is one of self-generated, an unsigned shared public value, a signed shared public value, or a secret value generated from a Diffie Hellman protocol.

In Example 20, the subject matter of any of Examples 18-19, wherein selecting the seed includes: receiving, from a partner in the replay protected communication, a command that specifies a mode; using the mode to update a multiplexer, the multiplexer having an input for each type of seed that is supported; and producing the seed via the multiplexer.

In Example 21, the subject matter of Example 20, wherein the command is a last communication in the initializing, the initializing including: a first request from the partner to begin the initializing; and a response to the first request that is replay protected with a zero-nonce, the zero-nonce not being a part of the nonce sequence, wherein the command uses the zero nonce to prevent a replay attack during the initializing.

In Example 22, the subject matter of Example 21, wherein the command is a data structure with an operation code field, a zero nonce field, a parameter field, a type of signature field, and a signature field.

In Example 23, the subject matter of Example 22, wherein the parameter field includes a mode identification and a payload.

In Example 24, the subject matter of any of Examples 18-23, comprising creating a second nonce, following the first nonce, in the nonce sequence by using the hash of the first nonce as the first input to the second nonce.

Example 25 is a machine readable medium including instructions for replay protection nonce generation, the instructions, when executed by processing circuitry, cause the processing circuitry to perform operations comprising: producing a hash from a first input, the hash having a first length; extracting a first subset of the hash as a selector; selecting a second subset of the hash using the selector, the second subset having a second length less than the first length; and transmitting the second subset as a nonce for a freshness value in a replay protected communication.

In Example 26, the subject matter of Example 25, wherein the first subset has a third length that is based on the first length and the second length.

In Example 27, the subject matter of Example 26, wherein the third length is equal to a number of bits to represent the first length divided by the second length.

In Example 28, the subject matter of Example 27, wherein the hash is divided into non-overlapping groups that have a length equal to the second length.

In Example 29, the subject matter of Example 28, wherein selecting the second subset of the hash using the selector includes: evaluating a numerical value of bits in the selector; and using a group in the non-overlapping groups that corresponds to the numerical value as the second subset.

In Example 30, the subject matter of any of Examples 25-29, wherein the instructions comprise initializing a nonce sequence, including the nonce as the first nonce, by selecting a seed as the first input.

In Example 31, the subject matter of Example 30, wherein the seed is a type that is one of self-generated, an unsigned shared public value, a signed shared public value, or a secret value generated from a Diffie Hellman protocol.

In Example 32, the subject matter of any of Examples 30-31, wherein selecting the seed includes: receiving, from a partner in the replay protected communication, a command that specifies a mode; using the mode to update a multiplexer, the multiplexer having an input for each type of seed that is supported; and producing the seed via the multiplexer.

In Example 33, the subject matter of Example 32, wherein the command is a last communication in the initializing, the initializing including: a first request from the partner to begin the initializing; and a response to the first request that is replay protected with a zero-nonce, the zero-nonce not being a part of the nonce sequence, wherein the command uses the zero nonce to prevent a replay attack during the initializing.

In Example 34, the subject matter of Example 33, wherein the command is a data structure with an operation code field, a zero nonce field, a parameter field, a type of signature field, and a signature field.

In Example 35, the subject matter of Example 34, wherein the parameter field includes a mode identification and a payload.

In Example 36, the subject matter of any of Examples 30-35, wherein the instructions comprise creating a second nonce, following the first nonce, in the nonce sequence by using the hash of the first nonce as the first input to the second nonce.

Example 37 is a system for replay protection nonce generation, the system comprising: means for producing a hash from a first input, the hash having a first length; means for extracting a first subset of the hash as a selector; means for selecting a second subset of the hash using the selector, the second subset having a second length less than the first length; and means for transmitting the second subset as a nonce for a freshness value in a replay protected communication.

In Example 38, the subject matter of Example 37, wherein the first subset has a third length that is based on the first length and the second length.

In Example 39, the subject matter of Example 38, wherein the third length is equal to a number of bits to represent the first length divided by the second length.

In Example 40, the subject matter of Example 39, wherein the hash is divided into non-overlapping groups that have a length equal to the second length.

In Example 41, the subject matter of Example 40, wherein the means for selecting the second subset of the hash using the selector include: means for evaluating a numerical value of bits in the selector; and means for using a group in the non-overlapping groups that corresponds to the numerical value as the second subset.

In Example 42, the subject matter of any of Examples 37-41, comprising means for initializing a nonce sequence, including the nonce as the first nonce, by selecting a seed as the first input.

In Example 43, the subject matter of Example 42, wherein the seed is a type that is one of self-generated, an unsigned shared public value, a signed shared public value, or a secret value generated from a Diffie Hellman protocol.

In Example 44, the subject matter of any of Examples 42-43, wherein the means for selecting the seed include: means for receiving, from a partner in the replay protected communication, a command that specifies a mode; means for using the mode to update a multiplexer, the multiplexer having an input for each type of seed that is supported; and means for producing the seed via the multiplexer.

In Example 45, the subject matter of Example 44, wherein the command is a last communication in the initializing, the initializing including: a first request from the partner to begin the initializing; and a response to the first request that is replay protected with a zero-nonce, the zero-nonce not being a part of the nonce sequence, wherein the command uses the zero nonce to prevent a replay attack during the initializing.

In Example 46, the subject matter of Example 45, wherein the command is a data structure with an operation code field, a zero nonce field, a parameter field, a type of signature field, and a signature field.

In Example 47, the subject matter of Example 46, wherein the parameter field includes a mode identification and a payload.

In Example 48, the subject matter of any of Examples 42-47, comprising means for creating a second nonce, following the first nonce, in the nonce sequence by using the hash of the first nonce as the first input to the second nonce.

Example 49 is at least one machine-readable medium including instructions that, when executed by processing circuitry, cause the processing circuitry to perform operations to implement of any of Examples 1-48.

Example 50 is an apparatus comprising means to implement of any of Examples 1-48.

Example 51 is a system to implement of any of Examples 1-48.

Example 52 is a method to implement of any of Examples 1-48.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A memory device for replay protection nonce generation, the memory device comprising:
   a hash engine to produce a hash from a first input, the hash having a first length; and
   processing circuitry to:
      extract a first subset of the hash as a selector;
      select a second subset of the hash using the selector, the second subset having a second length less than the first length; and
      transmit the second subset as a nonce for a freshness value in a replay protected communication.

2. The memory device of claim 1, wherein the first subset has a third length that is based on the first length and the second length.

3. The memory device of claim 2, wherein the third length is equal to a number of bits to represent the first length divided by the second length.

4. The memory device of claim 3, wherein the hash is divided into non-overlapping groups that have a length equal to the second length.

5. The memory device of claim 4, wherein, to select the second subset of the hash using the selector, the processing circuitry is configured to:
   evaluate a numerical value of bits in the selector; and
   use a group in the non-overlapping groups that corresponds to the numerical value as the second subset.

6. The memory device of claim 1, wherein the processing circuitry is configured to initialize a nonce sequence, wherein the nonce is used as the first nonce, and wherein a seed is selected as the first input.

7. The memory device of claim 6, wherein, to select the seed, the processing circuitry is configured to:
   receive, from a partner in the replay protected communication, a command that specifies a mode;
   use the mode to update a multiplexer, the multiplexer having an input for each type of seed that is supported; and
   produce the seed via the multiplexer.

8. The memory device of claim 6, wherein the processing circuitry is configured to create a second nonce, following the first nonce, in the nonce sequence, wherein the hash of the first nonce is used as the first input to the second nonce.

9. A method for replay protection nonce generation, the method comprising:
   producing a hash from a first input, the hash having a first length;

extracting a first subset of the hash as a selector;
selecting a second subset of the hash using the selector, the second subset having a second length less than the first length; and
transmitting the second subset as a nonce for a freshness value in a replay protected communication.

10. The method of claim 9, wherein the first subset has a third length that is based on the first length and the second length.

11. The method of claim 10, wherein the third length is equal to a number of bits to represent the first length divided by the second length.

12. The method of claim 11, wherein the hash is divided into non-overlapping groups that have a length equal to the second length.

13. The method of claim 12, wherein selecting the second subset of the hash using the selector includes:
evaluating a numerical value of bits in the selector; and
using a group in the non-overlapping groups that corresponds to the numerical value as the second subset.

14. The method of claim 9, comprising initializing a nonce sequence, including the nonce as the first nonce, by selecting a seed as the first input.

15. The method of claim 14, wherein selecting the seed includes:
receiving, from a partner in the replay protected communication, a command that specifies a mode;
using the mode to update a multiplexer, the multiplexer having an input for each type of seed that is supported; and
producing the seed via the multiplexer.

16. The method of claim 14, comprising creating a second nonce, following the first nonce, in the nonce sequence by using the hash of the first nonce as the first input to the second nonce.

17. A machine readable medium including instructions for replay protection nonce generation, the instructions, when executed by processing circuitry, cause the processing circuitry to perform operations comprising:
producing a hash from a first input, the hash having a first length;
extracting a first subset of the hash as a selector;
selecting a second subset of the hash using the selector, the second subset having a second length less than the first length; and
transmitting the second subset as a nonce for a freshness value in a replay protected communication.

18. The machine readable medium of claim 17, wherein the first subset has a third length that is based on the first length and the second length.

19. The machine readable medium of claim 18, wherein the third length is equal to a number of bits to represent the first length divided by the second length.

20. The machine readable medium of claim 19, wherein the hash is divided into non-overlapping groups that have a length equal to the second length.

21. The machine readable medium of claim 20, wherein selecting the second subset of the hash using the selector includes:
evaluating a numerical value of bits in the selector; and
using a group in the non-overlapping groups that corresponds to the numerical value as the second subset.

22. The machine readable medium of claim 17, wherein the instructions comprise initializing a nonce sequence, including the nonce as the first nonce, by selecting a seed as the first input.

23. The machine readable medium of claim 22, wherein selecting the seed includes:
receiving, from a partner in the replay protected communication, a command that specifies a mode;
using the mode to update a multiplexer, the multiplexer having an input for each type of seed that is supported; and
producing the seed via the multiplexer.

24. The machine readable medium of claim 22, wherein the instructions comprise creating a second nonce, following the first nonce, in the nonce sequence by using the hash of the first nonce as the first input to the second nonce.

* * * * *